United States Patent [19]
Barraud et al.

[11] Patent Number: 5,650,231
[45] Date of Patent: Jul. 22, 1997

[54] POLYMERIC RESIN FOR OPTICAL FIBER STRIPS

[75] Inventors: Jean-Yves Barraud, Paris; Sophie Gervat, Les Clayes Sous Bois, both of France

[73] Assignee: Alcatel Cable, Clichy Cedex, France

[21] Appl. No.: 470,025

[22] Filed: Jun. 6, 1995

Related U.S. Application Data

[63] Continuation of Ser. No. 114,398, Sep. 1, 1993, abandoned.

[30] Foreign Application Priority Data

Sep. 7, 1992 [FR] France ................................ 92 10638

[51] Int. Cl.$^6$ ................................ B32B 9/00; B32B 25/20; C08F 283/12
[52] U.S. Cl. ........................ 428/391; 428/373; 428/378; 385/115; 525/92 A; 525/92 C; 525/92 G; 525/92 H; 525/100; 525/107; 525/123; 525/125; 525/474; 525/476; 525/479; 442/175
[58] Field of Search .................... 525/100, 123, 525/125, 474, 479, 92 A, 92 C, 92 G, 92 H, 107, 476; 528/20, 21, 28; 385/115; 428/266, 288, 373, 378, 391

[56] References Cited

U.S. PATENT DOCUMENTS

| | | | |
|---|---|---|---|
| 4,543,398 | 9/1985 | Bany et al. | 525/474 |
| 4,684,538 | 8/1987 | Klemarczyk | 528/28 |
| 4,738,509 | 4/1988 | Broer et al. | 428/373 |
| 4,889,768 | 12/1989 | Yokoshima et al. | 525/29 |
| 5,264,278 | 11/1993 | Mazurek et al. | 525/479 |

FOREIGN PATENT DOCUMENTS

| | | |
|---|---|---|
| 0149741 | 7/1985 | European Pat. Off. . |
| 0447789A1 | 9/1991 | European Pat. Off. . |
| 0407004 | 1/1992 | European Pat. Off. . |
| WO8400424 | 2/1984 | WIPO . |
| 0394918 | 10/1990 | WIPO . |
| WO9117198 | 11/1991 | WIPO . |

OTHER PUBLICATIONS

French Search Report FR 9210638.

*Primary Examiner*—Randy Gulakowski
*Attorney, Agent, or Firm*—Sughrue, Mion, Zinn, Macpeak & Seas

[57] ABSTRACT

A polymeric resin for optical fiber strips is formed from a mixture comprising a first base polymer selected from an epoxy acrylate and a urethane acrylate and a copolymer in a proportion of between 0.5% and 20% by weight of said mixture which is compatible with said first polymer and carries polysiloxane chains.

11 Claims, No Drawings

POLYMERIC RESIN FOR OPTICAL FIBER STRIPS

This is a Continuation of application Ser. No. 08/114,398 filed Sep. 1, 1993, now abandoned.

BACKGROUND OF THE INVENTION

1. Field of the Invention

The present invention concerns a polymeric resin for optical fiber strips.

2. Description of the Prior Art

Known optical fibers comprise a double polymeric coating constituted by a plasticized primary coating in contact with the glass fiber and itself covered by a secondary coating.

This double coating protects the fiber against mechanical or chemical attack which could increase optical transmission attenuation.

Such polymers are also used to join fibers together to produce strips for use in optical cables. Existing fibers and strips use urethane acrylate type polymeric coatings which are photoreticulated under ultraviolet light. The optical fibers, which are distinguishable by a thin colored organic layer, are assembled together side-by-side by a urethane acrylate resin.

Strips which are made in this fashion are not able to slip over each other sufficiently to optimize cable compactness. In addition, the strip resin adheres too strongly to the thin colored organic layers of the individual fibers when the resin has to be removed to connect the individual fibers of two strips. Finally, urethane acrylates can absorb a considerable quantity of moisture but even ground transmission applications of optical fibers require optimum imperviousness to ingress of moisture.

An object of the present invention is to improve urethane acrylate type resins for their use in fiber optic strips.

SUMMARY OF THE INVENTION

The present invention provides a polymeric resin for optical fiber strips formed from a mixture comprising a first base polymer selected from epoxy acrylate and urethane acrylate and a block copolymer in a proportion of between 0.5% and 20% by weight of said mixture containing a polydimethylsiloxane block and a block selected from urethane, epoxyurethane, epoxy, urethane acrylate, epoxyacrylate and epoxyurethane acrylate.

Said copolymer is advantageously in a proportion of between 1% and 10% by weight of said mixture.

A resin in accordance with the invention has much improved slip as compared with prior art resins, as shown by measuring the contact angle with a drop of water.

Said copolymer advantageously has one of the following formulas:

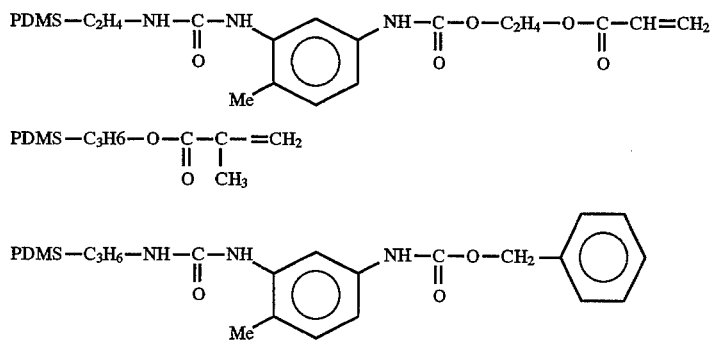

Said mixture preferably further comprises a second polymer in a proportion of less than 20% by weight of said mixture selected from polydimethylsiloxane (PDMS) and polymethylphenylsiloxane.

The presence of the copolymer allows the second polymer to be incorporated into said mixture, which otherwise is not possible. The copolymer effectively renders the first and second polymers compatible; the alloy of polymers thus formed combines all the properties of these two base polymers, in particular improved slip.

Further features and advantages of the present invention will become apparent from the following description of illustrative, non-limiting examples.

DETAILED DESCRIPTION OF THE INVENTION

EXAMPLE 1

The first base polymer was a urethane acrylate resin, trademark "DESOLITE 932". It was mixed at 40° C. with 10% (by weight) of polysiloxane polyurethane copolymer having the formula:

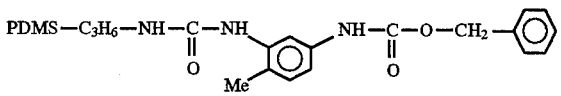

This copolymer was obtained by reacting 174 g (1 mole) of toluene diisocyanate, 108 g (1 mole) of benzyl alcohol and 1 229 g (1 mole $NH_2$) of aminated polysiloxane in 1 943 g of xylene.

EXAMPLE 2

The first base polymer was a urethane acrylate resin, trademark "DESOLITE 931". It was mixed at 40° C. with 15% (by weight) of a graft copolymer of polysiloxane grafted with urethane acrylate having the formula:

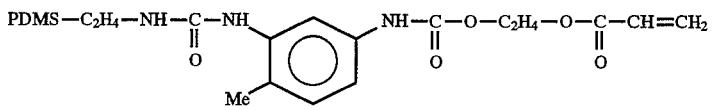

This copolymer was obtained by reacting 1 229 g (1 mole NH$_2$) of aminated polysiloxane with the reaction product from the reaction of hydroxyethylacrylate with toluene diisocyanate, the reaction product having the formula:

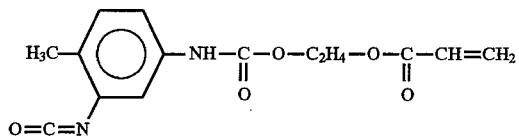

EXAMPLE 3

The first base polymer was the resin of example 1, trademark "DESOLITE 932". It was mixed at 40° C. with:

3% by weight of the polysiloxane-polyurethane copolymer of example 1, and

9% by weight of a second polymer in the form of polydimethylsiloxane.

Samples 1, 2 and 3 of 60 μm thick film were prepared with the material from examples 1 to 3, respectively, by photoreticulation at 312 nm and 30 mJoules/minute for 30 minutes.

A reference sample (prior art) was prepared in the same fashion using only the base polymer of example 1.

The slip of the samples was determined using the angle of contact θ of a water droplet at 22° C. Table I summarises the results obtained.

TABLE I

| Sample | θ |
|---|---|
| reference | 82° |
| sample 1 | 102° |
| sample 2 | 103° |
| sample 3 | 106° |

The invention is not limited to the embodiments described herein. Any means may be replaced by equivalent means without departing from the scope of the invention.

There is claimed:

1. An optical fiber strip comprising several optical fibers, each distinguishable by a thin colored organic layer and wherein the fibers are assembled together side-by-side by joining through a polymeric resin formed from a polydimethylsiloxane (PDMS)-containing mixture comprising:

(A) a first base polymer selected from the group consisting of epoxy acrylate and urethane acrylate and (B) a PDMS-containing block copolymer, in an amount of between 0.5% and 20% by weight of said mixture, wherein the PDMS-containing copolymer further contains a block selected from the group consisting of urethane, epoxyurethane, epoxy, urethane acrylate, epoxy acrylate and epoxyurethane acrylate.

2. The optical fiber strip according to claim 1 wherein said PDMS-containing copolymer is present in a proportion of between 1% and 10% by weight of said mixture.

3. The optical fiber strip according to claim 1 wherein said PDMS-containing copolymer has one of the following formulae:

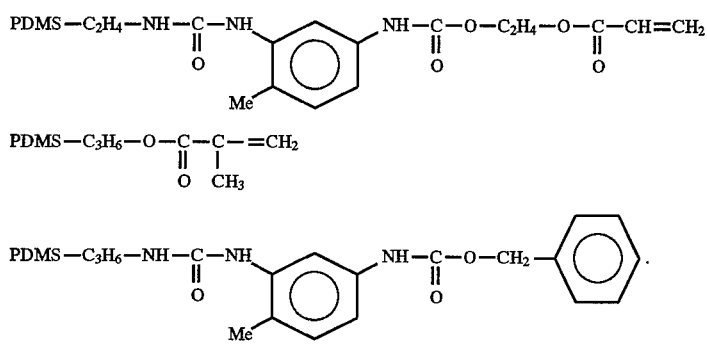

4. The optical fiber strip of claim 1, wherein the first base polymer (A) is an epoxy acrylate.

5. The optical fiber strip of claim 1, wherein the first base polymer (A) is an urethane acrylate.

6. The optical fiber strip of claim 1, wherein the copolymer contains urethane as the block.

7. The optical fiber strip of claim 1, wherein the copolymer contains epoxyurethane as the block.

8. The optical fiber strip of claim 1, wherein the copolymer contains epoxy as the block.

9. The optical fiber strip of claim 1, wherein the copolymer contains urethane acrylate as the block.

10. The optical fiber strip of claim 1, wherein the copolymer contains epoxy acrylate as the block.

11. The optical fiber strip of claim 1, wherein the copolymer contains epoxyurethane acrylate as the block.

* * * * *